April 16, 1946.  F. E. SEIFERT  2,398,601
AIRCRAFT CONTROL
Filed Dec. 2, 1943   3 Sheets-Sheet 3

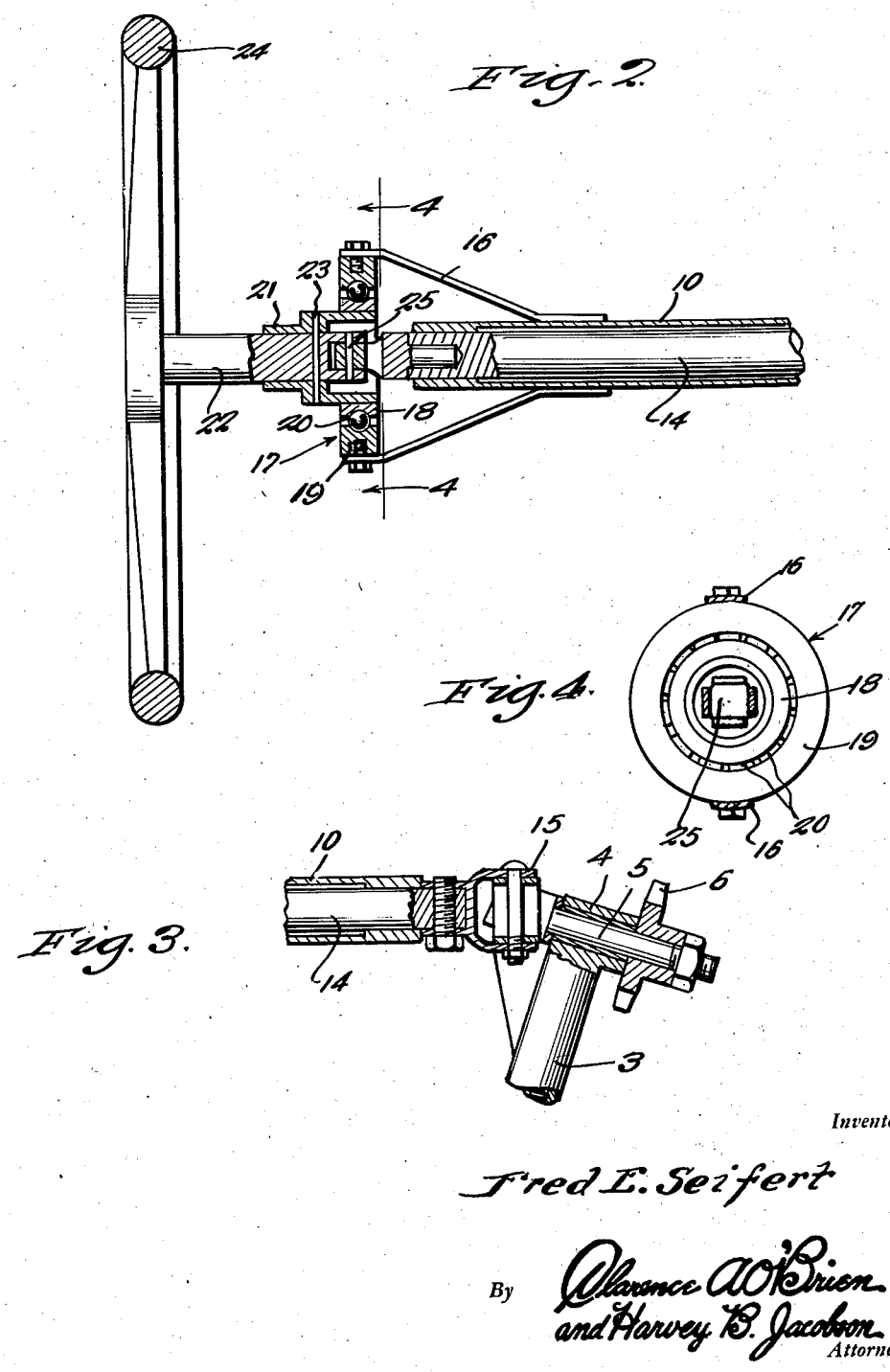

Inventor
Fred E. Seifert

By Clarence A. O'Brien
and Harvey B. Jacobson
Attorneys

Patented Apr. 16, 1946

2,398,601

UNITED STATES PATENT OFFICE 2,398,601

AIRCRAFT CONTROL

Frederick E. Seifert, Ames, Iowa, assignor of thirty-three and one-third per cent to Ed. J. Kelley, and fifteen per cent to A. Earle Weatherwax Application December 2, 1943, Serial No. 512,607

1 Claim. (Cl. 244—83)

This invention relates to new and useful improvements in controls for heavier-than-air flying machines, particularly airplanes, and has for its primary object to provide, in a manner as hereinafter set forth, a mechanical apparatus comprising a novel construction, combination and arrangement, whereby the present coordination required between the hands and the feet of the pilot is completely eliminated.

Other objects of the invention are to provide an aircraft control of the aforementioned character which will be comparatively simple in construction, strong, durable, highly efficient and reliable in operation, compact, light in weight, and which may be manufactured and installed at low cost.

All of the foregoing, and still further objects and advantages of the invention, will become apparent from a study of the following specification, taken in connection with the accompanying drawings, wherein like characters of reference designate corresponding parts throughout the several views, and wherein:

Figure 2 is a view in vertical longitudinal section through the rear portion of the apparatus.

Figure 3 is a view in vertical longitudinal section through the forward portion of the apparatus with parts omitted.

Figure 4 is a cross-sectional view, taken substantially on the line 4—4 of Figure 2.

Figure 1:
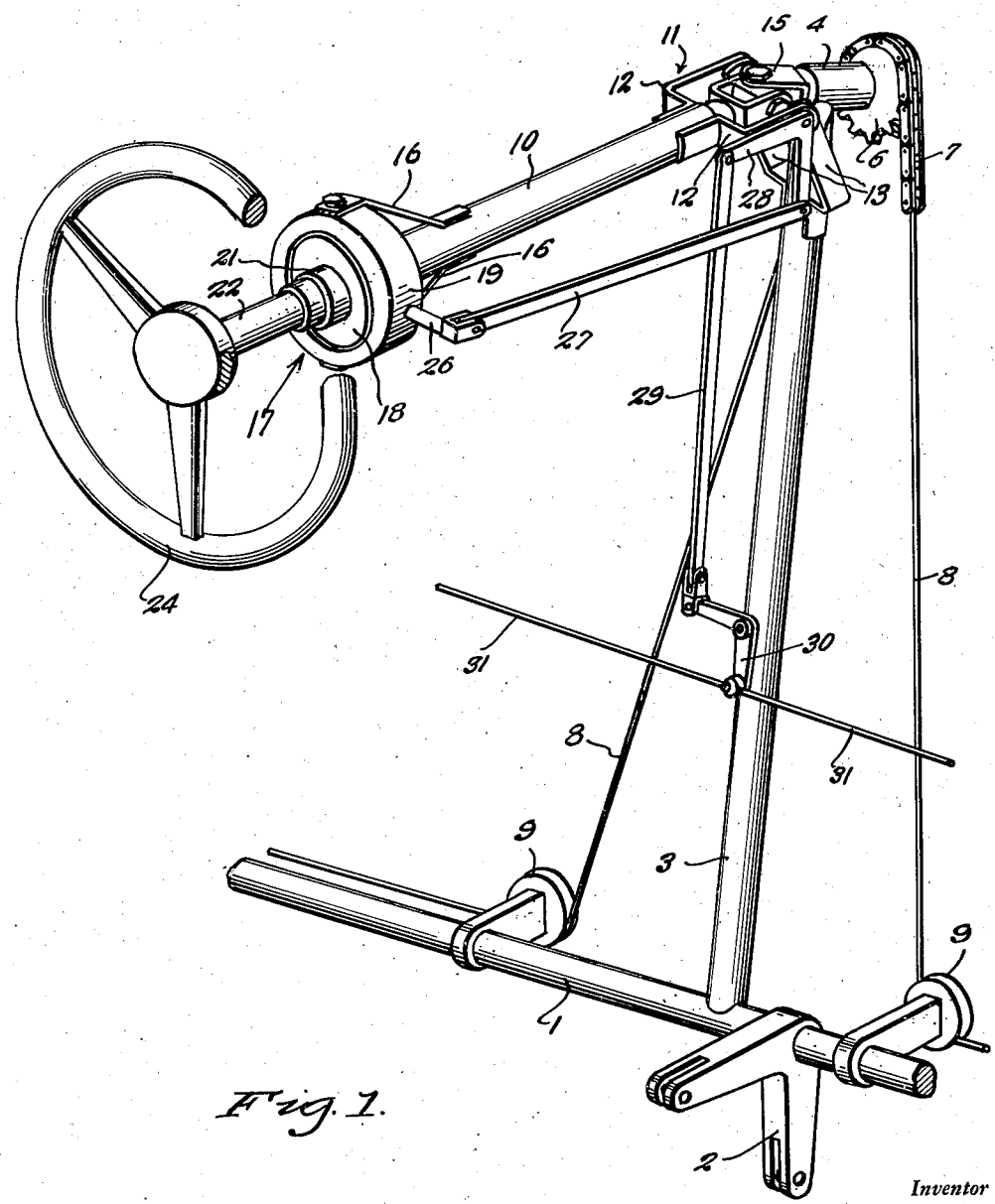
Figure 1 is a perspective view of an aircraft control constructed in accordance with the present invention, a portion of the wheel being broken away.
Figure 5:
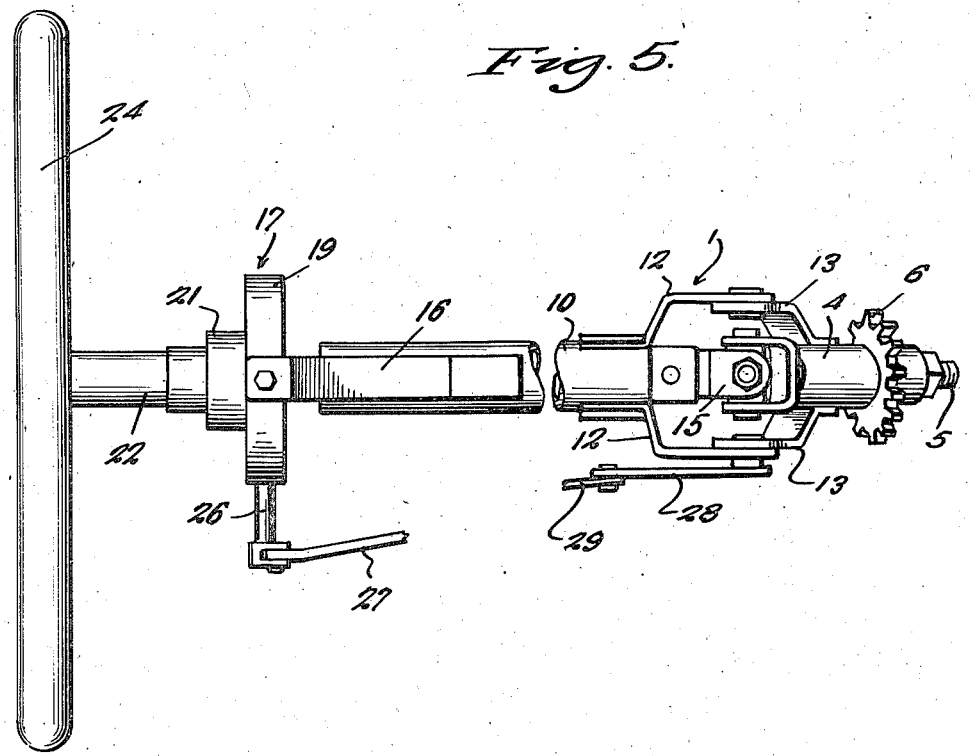
Figure 5 is a top plan view with parts omitted.
Figure 6:
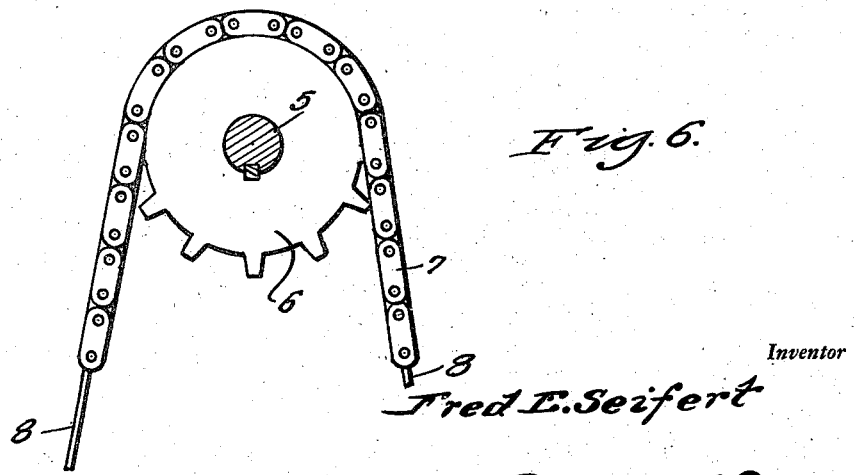
Figure 6 is a cross-sectional view through the forward portion of the device.

Referring now to the drawings in detail, it will be seen that the embodiment of the apparatus which has been illustrated comprises a transverse rockable shaft 1. Fixed on the shaft 1 is a bell crank lever 2. The bell crank lever 2 is to be operatively connected in any suitable manner to the elevator of the airplane or other craft. Also fixed on the shaft 1 is a tubular post 3 having a bearing 4 on its upper end. A comparatively short shaft 5 is journaled in the bearing 4 and has fixed thereon a sprocket gear 6. A chain 7 is trained over the sprocket gear 6. Cables 8 are connected, at one end, to the ends of the chain 7. The cables 8 pass under guide pulleys 9 on the shaft 1 and are operatively connected to the usual ailerons of the machine.

Mounted for vertical swinging movement on the upper portion of the post 3 is a tubular housing 10. The tubular housing 10 is connected to the post 3 by a hinge structure 11. The hinge structure 11 includes pairs of pivotally connected brackets 12 and 13 which are fixed, respectively, on the housing 10 and the post 3. A shaft 14 is journaled in the housing 10. A suitable universal joint 15 operatively connects the shaft 14 to the shaft 5.

Mounted on the rear end portion of the housing 10 is a pair of brackets 16. Pivotally mounted between the rear end portions of the brackets 16 is a ball bearing 17. The bearing 17 includes inner and outer races 18 and 19, respectively, with balls 20 therebetween.

Fixed in the inner race 18 of the bearing 17 is a tubular coupling 21. A stub shaft 22 projects into the coupling 21 and is secured therein by a pin 23. A hand wheel 24 is fixed on the rear end portion of the shaft 22. A suitable universal joint 25 operatively connects the shaft 22 at its forward end to the shaft 14.

An arm 26 projects laterally from the outer race 19 of the bearing 17. A link 27 has one end pivotally connected to the arm 26. The other end of the link 27 is pivotally connected to one end of a bell crank lever 28 which is pivotally mounted on one side of the hinge structure 11. A link 29 operatively connects the bell crank lever 28 to a bell crank lever 30 on the post 3. Cables 31 operatively connect the bell crank lever 30 to the usual rudders of the craft.

It is thought that the operation of the apparatus will be readily apparent from a consideration of the foregoing. Briefly, to operate the ailerons, the wheel 24 is rotated to turn the shafts 22, 14 and 5, thereby actuating the chain 7 and the cables 8. To operate the rudders, the wheel 24 with the shaft 22 and the assembly thereon are swung laterally on the bracket 16 for actuating the cables 31 through the members 26 to 30, inclusive. To operate the elevator, the wheel 24 is pushed forwardly or pulled rearwardly for rocking the shaft 1 with the bell crank lever 2 thereon. The construction and arrangement, it will be observed, is such that the control surfaces of the craft may be actuated in unison or independently of each other. Further, the pilot may accomplish this with one or both hands, leaving both feet free.

It is believed that the many advantages of an aircraft control constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

A control for aircraft, of the type including ailerons, an elevator and rudders comprising a rockable shaft, a bell crank lever fixed on said shaft for operative connection with the elevator, a post fixed on the shaft, a bearing on the upper end of said post, a shaft journaled in said bearing, means operatively connecting the second-named shaft to the ailerons, a tubular housing, a hinge structure pivotally connecting the housing to the post for vertical swinging movement, a shaft journaled in said housing and operatively connected to the second-named shaft, a bearing mounted for swinging movement on the housing, a shaft journaled in said bearing and operatively connected to the third-named shaft, a wheel fixed on the fourth-named shaft, a bell crank lever pivotally mounted on the hinge structure, a link operatively connecting the bearing to said bell crank lever, a bell crank lever mounted on the post, a link operatively connecting the first-named bell crank lever to the second-named bell crank lever, and cables operatively connecting said second-named bell crank lever to the rudders.

FRED. E. SEIFERT.